UNITED STATES PATENT OFFICE.

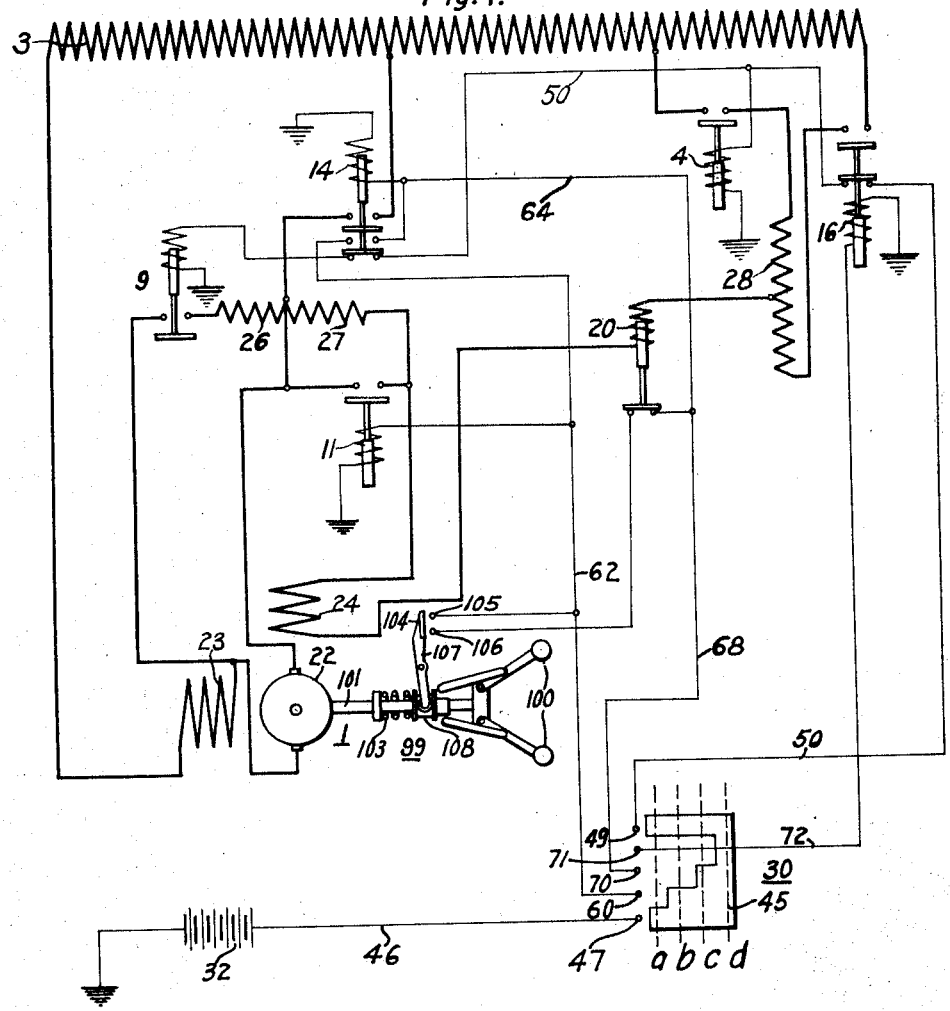

HURD T. MORRIS, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,386,016. Specification of Letters Patent. Patented Aug. 2, 1921.

Original application filed June 4, 1915, Serial No. 32,183. Divided and this application filed July 12, 1917. Serial No. 180,041.

*To all whom it may concern:*

Be it known that I, HURD T. MORRIS, a citizen of the United States, and a resident of Wilkinsburg, in the county of Allegheny and State of Pennsylvania, have invented a new and useful Improvement in Systems of Control, of which the following is a specification, this application being a division of application Serial No. 32,183, filed June 4, 1915, patented Aug. 14, 1917, No. 1,236,742.

My invention relates to systems of control for alternating-current motors of the commutator type, and it has for its object to provide a system which shall embody certain novel features for effecting reliable and satisfactory operation of motors of the above-indicated character.

Heretofore, in control systems in which alternating-current motors have been initially connected as repulsion motors and subsequently connected as doubly-fed motors, it has been common practice either to manually control the system throughout, in which case no assurance is given that the change to doubly-fed connection is effected under proper or permissible commutating conditions, or to effect complete automatic control of the system, in which instance, relatively expensive and complicated systems have obtained.

According to the present invention, I provide a system in which the change from repulsion to doubly-fed connection of the motors is automatically effected, under proper commutating conditions, and the government of the remainder of the system is manually controlled, thus, to a certain degree, obtaining the advantages of both types of control. Other novel control features of my invention will be hereinafter pointed out.

In the accompanying drawings, Figure 1 is a diagrammatic view of the essential main and auxiliary circuits of a system of control embodying my invention and Fig. 2 is a chart of well-known form for indicating the sequence in which the various switches operate.

Referring to Fig. 1 of the drawings, the system here shown comprises a single-phase commutator motor 1 that is adapted to be supplied with energy from a transformer 3 by means of a plurality of switches 4, 9, 11, 14 and 16 and a current relay 20 of a familiar type. The motor 1 comprises an armature 22, a main or exciting field winding 23 and an auxiliary or inducing field winding 24. A resistor 26 is employed for short-circuiting the armature 22 during certain control steps, and an accelerating resistor 27 is connected in series-circuit relation with the motor armature 22. A resistor 28 is employed in order to avoid short-circuiting portions of the winding of the transformer 3 during changes in the motor-circuit connections. The relay 20 is provided with an actuating coil that is connected in circuit with the inducing field winding 24 of the motor 1.

The figure further shows the auxiliary circuits for governing the operation of the main-circuit switches, such circuits comprising actuating coils for the switches, electrical interlocks of a familiar character that are respectively associated with certain of the switches; a master controller 30 that is adapted to occupy a plurality of positions $a$ to $d$, inclusive; a source of energy, such as a battery 32, for supplying energy, through the master controller, to the various actuating coils; a centrifugal device 99; and contact members of the current relay 20.

The centrifugal device 99 and its attendant control circuits are adapted to effect the transition of the motor to the doubly-fed connection when the current in the inducing field winding assumes the correct commutating value and when the speed of the motor concurrently reaches a predetermined value, as subsequently set forth in detail. This device comprises a plurality of weights or balls 100 that are revolved by a shaft 101 and are thrown outwardly, against the pressure of a spring 103, by the centrifugal force of revolution. A contact member 104 automatically bridges conductors 105 and 106 when a predetermined motor speed is reached by reason of the mechanical connection of a contact-carrying arm 107, and a movable sleeve 108 that is actuated by the revolving balls 100.

Assuming that the transformer 3 is energized and that the controller 30 occupies the position shown in the drawings, the motor is started into operation by moving the master controller 30 to its initial position $a$ in which the switches 4 and 9 are closed, as indicated in line $a$ of the sequence chart, Fig. 2. The main segment 45 of the master controller 30 is energized from the battery 32 by means of a conductor 46 and a contact finger 47. A circuit is established from the contact finger 49, through conductors 50 and out directly to the actuating interlock 16—out directly to the actuating coil for switch 4 and, through an interlock 14—out, to the actuating coil of switch 9, whence circuit is continued to a grounded conductor which is connected to the negative terminal of the battery 32.

The closure of switches 4 and 9, in the initial position $a$ of the controller 30, establishes a repulsion connection for the motor with the resistor 26 connected across the armature 22, while the accelerating resistor 27 is included in series-circuit relation with the motor 1 across a suitable portion of the transformer winding 3.

When the master controller 30 is moved to its second position $b$, an additional circuit is established from the contact finger 60, through conductor 62, to the actuating coil of switch 11. The resistor 27 is thus short-circuited by the switch 11, in order to effect a predetermined degree of acceleration of the motor.

From this step, the transition of the motor to the doubly-fed connection is automatically effected in the following manner. When the inducing field current decreases to a value suitable for transition, the relay 20 drops to its lowermost position, and the contact member 104 is moved in accordance with the increase of motor speed until the conductors 105 and 106 are bridged. This completes an energizing circuit for the switch 14 that is established from the conductor 62, through the contact member 104, contact members of the relay 20, conductor 64 and the energizing coil for switch 14, to the grounded return conductor. The closure of the switch 14 causes an interlock 14—in to bridge the conductors 62 and 64 to establish a holding circuit.

After the switch 14 is closed, the operation of the system is independent of the operation of the relay 20 and the centrifugal device.

Switch 9 opens after the closure of switch 14, as indicated in step $c$ of the sequence chart, by reason of the exclusion from its coil circuit of the interlock 14—out, to remove the repulsion connection and connect the motors in doubly-fed relation.

Attention is directed to the fact that the actuating coil for the relay 20 is connected in circuit with the inducing field winding of the motor in order that the transition of the motor to the doubly-fed connection will be effected when the current in the inducing field winding reaches a value which will permit of good commutation during the transition period.

The doubly-fed connection for the motor is thus completed substantially as soon as the relay 20 drops to its lowermost position.

It will be noted that the master controller 30 has remained in its position $b$ during the entire transition of the motor to the doubly-fed connection, which was automatically effected during the best commutating conditions.

A conductor 68 may be arbitrarily energized by moving the controller 30 to position $c$ in order to effect the transition of the motor from the repulsion to the doubly-fed connection, at the will of the operator. For this position, a contact finger 70 engages the segment 45 of the controller to energize the conductor 68.

It is thus seen that the transition of the vehicle motor to the doubly-fed connection may be automatically effected by a suitable limit switch or may be manually established by moving the controller to the next subsequent position.

When the master controller 30 is moved to its position $d$, a circuit is completed from the contact finger 71 through conductor 72 and the actuating coil of the switch 16 to the grounded return-circuit conductor. When the switch 16 closes, the switch 4 is opened by reason of the interruption of its control circuit at the interlock 16—out. An increased voltage is thus impressed upon the motor to effect further acceleration.

It will be understood that the centrifugal device described is merely illustrative of a principle and that any other centrifugally operated switch may be employed to effect the same result.

I do not wish to be restricted to the specific circuit connections or arrangement of parts herein set forth, since various modifications thereof may be made without departing from the spirit and scope of my invention. I desire, therefore, that only such limitations shall be imposed as are indicated in the appended claims.

I claim as my invention:

1. A system of control comprising an alternating-current motor of the commutator type, a plurality of manually-controlled switches severally having actuating coils, means for starting the motor as a repulsion motor, centrifugally-governed means for automatically establishing a partial auxiliary circuit for said coils when the motor attains a predetermined speed, and a limit switch actuated in accordance with the current in a part of the motor circuit for automatically completing said auxiliary circuit to effect transition to the doubly-fed connection of the motor.

2. A system of control comprising an alternating-current motor of the commutator type having an exciting and an inducing field winding, a plurality of motor-controlling switches severally having actuating coils, a multi-position switching device for said coils for initially connecting the motor as a repulsion motor, centrifugally-governed means for automatically establishing a partial auxiliary coil circuit when the motor attains a predetermined speed, and a limit switch for automatically completing said auxiliary circuit to effect transition to the doubly-fed connection of the motor when a proper value of current obtains in said commutating field winding, said switching device being also adapted to subsequently effect further acceleration of the motor.

In testimony whereof I have hereunto subscribed my name this 27th day of June, 1917.

HURD T. MORRIS.